Nov. 13, 1951    J. F. ATKINSON ET AL    2,574,458
REMOTE MONITORING SYSTEM
Filed June 27, 1947    5 Sheets-Sheet 1

*Carrier supplied from central to a plurality of stations each of which amplitude modulates the carrier at a different rate.*

*Receiver has selecting means responsive to the rates of modulation*

*Uses power transmission line*

JOHN F. ATKINSON
SAMUEL LUBIN
INVENTORS

BY Arthur P. Connolly
Attorney

Nov. 13, 1951  J. F. ATKINSON ET AL  2,574,458
REMOTE MONITORING SYSTEM
Filed June 27, 1947  5 Sheets-Sheet 3

JOHN F. ATKINSON
SAMUEL LUBIN
INVENTORS

BY Arthur G. Connolly
attorney

JOHN F. ATKINSON
SAMUEL LUBIN
INVENTORS

BY Arthur G. Connolly
attorney

Patented Nov. 13, 1951

2,574,458

UNITED STATES PATENT OFFICE 2,574,458

REMOTE MONITORING SYSTEM

John F. Atkinson and Samuel Lubin, Arlington, Va., assignors to Sprague Electric Company, North Adams, Mass., a corporation of Massachusetts Application June 27, 1947, Serial No. 757,422

8 Claims. (Cl. 177—353)

This invention relates to a remote monitoring and telemetering system and more particularly refers to means for monitoring and telemetering signals and devices remotely located in electric transmission and distribution systems.

The advantages of carrier current signalling and monitoring systems on electric transmission and distribution systems have been recognized for some years. A number of devices for carrier current telephony and signal transmission have been proposed and used heretofore. In many instances, particularly those which involve the opening and closing of a circuit at a point on the transmission line, it has been expensive and in many cases not practical to obtain satisfactory monitoring from a central station. As a general rule, previous systems for indication of the opening of circuit breakers or for telemetering by carrier current, for example, have required the installation of separate carrier frequency transmitters at each circuit breaker or metered point. Signals from these transmitters are then received and interpreted by a centrally located receiver. Systems of this type call for expensive and bulky equipment in each location and for this and other reasons have not been widely adopted.

It is an object of this invention to overcome the foregoing and related disadvantages. A further object is to produce an improved system for monitoring and telemetering by means of carrier current. A still further object is to produce an improved remote monitoring and telemetering system which requires but a single centrally located transmitter and receiver. A still further object is to produce a remote monitoring system requiring a minimum of monitoring equipment at the various stations on the line. A still further object is to provide a means for remotely modulating a continuous wave current or voltage generated by a carrier current transmitter and a method for detecting the presence of such modulation.

These and other objects are attained in accordance with the present invention which comprises a circuit including a carrier current transmission line, a central transmitter and receiver station and one or more remotely located monitor stations, each monitor being provided with a modulator operating at a different modulation frequency. In a more restricted sense this invention is concerned with a carrier current monitoring and telemetering system which comprises a carrier transmitter generating a continuous wave voltage of some predetermined frequency, a remotely located series resonant monitoring modulator and a centrally located receiver which may be tuned to the frequency generated by the transmitter. In a still more restricted sense this invention is concerned with unique reactance modulators which may be used in the foregoing and many other electrical circuits for the foregoing and additional purposes. The invention is also concerned with novel monitors useful in the above and related monitoring and telemetering systems.

Reference will be made to the appended drawings, which illustrate some of the embodiments of our invention, in which Figure 1 shows a layout of a remote monitoring system;

Figure 1:
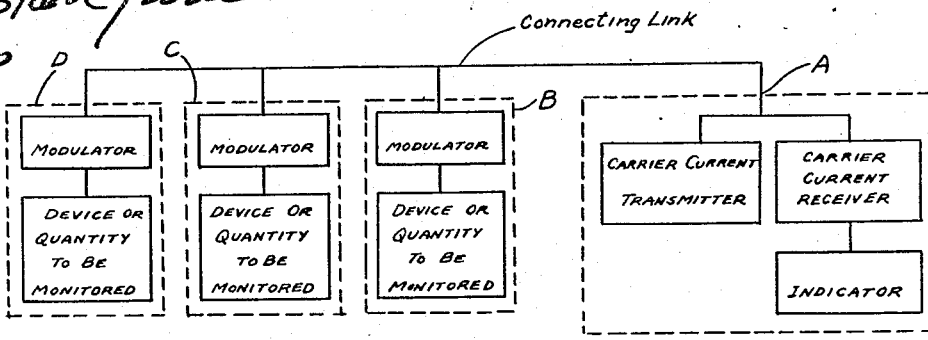

Referring more specifically to Figure 1, the transmitter, located at A, sends an unmodulated signal at carrier frequency over the line to a modulator such as the one located at B. The modulator located at B comprises a resonant circuit tuned to the frequency of the transmitter at A, and an interrupting or detuning device which interrupts or detunes the modulator at a predetermined low frequency. This causes the impedance of the power line to the carrier frequency to vary at the low frequency rate by a small but measurable degree. Thus the high frequency carrier current supplied by the transmitter will vary slightly in magnitude at the predetermined low frequency rate. The carrier current has thus been modulated by a remotely located modulator. This modulated current can be received and interpreted by the centrally located receiver and changes or interruption of the modulation may be utilized to indicate the opening of a circuit breaker, changes in physical constants at the metered points, etc.

Figure 2:
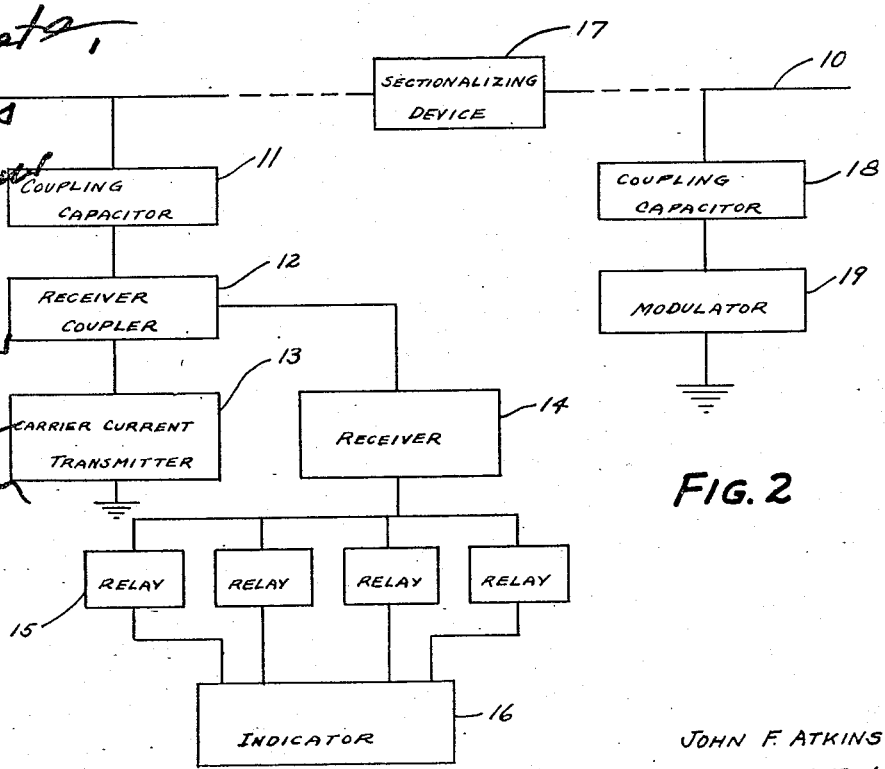
Figure 2 shows a specific central station and remote layout.

In utilizing this system for indicating the opening of a circuit breaker or other sectionalizing device, such as a fuse, on an electric power system, our carrier current monitoring system comprises the main elements shown in Figure 2. The carrier current transmitter 13 generates a continuous wave voltage which causes an unmodulated current of some predetermined frequency to flow through the receiver coupler 12 and coupling capacitor 11 into the power line 10. The magnitude of this curent is determined by the voltage generated at the transmitter terminals and the impedance of the series circuit consisting of receiver coupler 12, coupling capacitor 11, the power line 10, the sectionalizing device 17, the coupling capacitor 18, the modulator 19 and the return circuit through the ground or other conductor to the transmitter 13.

The modulator 19 comprises a circuit which, together with the coupling capacitor 18, is resonant at the frequency of the transmitter 13, and an interrupting or detuning device which interrupts or detunes the modulator at a predetermined frequency lower than the frequency of transmitter 13. Power for the operation of the interrupting or detuning device is supplied from the power line 10 on the load side of the sectionalizing device 17. This interruption or detuning action causes the impedance of the series circuit described above to vary by a small but measurable degree, depending on the circuit constants and the length of the power line between the transmitter and the modulator. Thus the current supplied by the transmitter will vary in magnitude at the predetermined low frequency of the modulator. This varying current will pass through the receiver coupler 12 which consists of a series resistance or impedance and will thus produce a modulated carrier voltage across the terminals of the receiver coupler 12. The carrier frequency of this modulated voltage will be the frequency of transmitter 13 and the modulating frequency will be the rate of interruption or detuning of modulator 19.

Receiver 14 amplifies and demodulates this modulated carrier voltage, supplying at the output of the receiver a current of frequency equal to that of the modulator 19. This low frequency is fed into frequency sensitive relays 15 (with or without previous amplification by a frequency selective amplifier) and then to indicator 16 which indicates the presence of the modulator frequency by lighting a signal lamp, sounding a steady tone in a loudspeaker, continuous ringing of a bell or sounding of a buzzer, or by any other convenient means.

When the sectionalizing device 17 opens, the power supply to the modulator detuning or interrupting device is shut off. Thus the impedance of the series circuit from the transmitter through the power line becomes constant and the carrier voltage across the terminals of the receiver coupler 12 is unmodulated. As a result of this there will be no low frequency output from the receiver 14 to the frequency selective relay 15 and indicator 16. The absence of this modulation may be indicated by the extinguishing of the signal lamp, lighting of a lamp of another color, sounding of an audible signal or other convenient method.

Where a plurality of sectionalizing devices is present on the power line, each sectionalizing device such as 17 may have associated with it a modulator 19 and coupling capacitor 18. Each modulator will be detuned or interrupted at a different low frequency rate and thus various modulating frequencies will appear at the terminals of the receiver coupler 12. The receiver 14 will amplify the carrier voltage together with all these modulating frequencies and demodulate them. Each of the modulating frequencies will then be fed into separate selective relays as shown at 15 and thence to indicators 16. Thus the absence of any one modulating frequency will be indicated by its individual indicator, signifying that the sectionalizing device associated with the modulator of that frequency is open.

Figure 3:
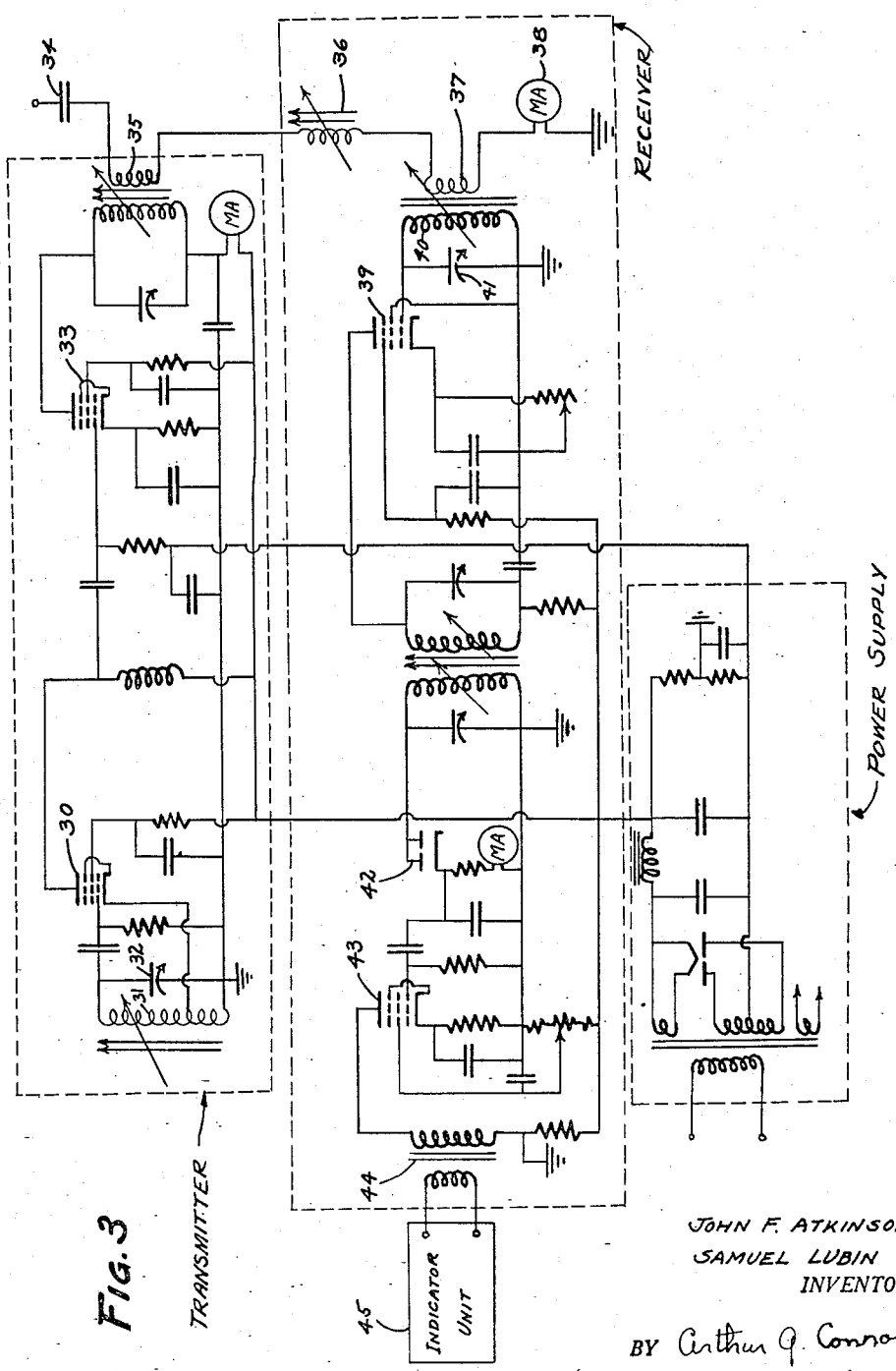
Figure 3 shows the schematic electrical circuit of one embodiment of a transmitter-receiver unit of the invention.

One of the preferred embodiments of our invention employing the above stated remote modulation principle, is described in connection with Figure 3, in which the transmitter consists of a carrier frequency oscillator stage, 30, the frequency of which is controlled by the inductance 31 and capacitance 32 and a carrier frequency power amplifier stage 33, whose output is fed into the line coupling capacitor 34. The lower end of the output winding 35 is connected to a variable tuning inductance 36, receiver coupler 37, tuning indicator 38 and thence to ground. Thus the carrier frequency energy is not only fed into the line but a small portion of it is induced into the first stage 39 of the receiver, which is tuned to the carrier frequency by means of inductance 40 and capacitance 41. The signal is amplified and fed into the detector stage 42. If modulation is present the modulating frequency will appear at the output of the detector. This modulaing frequency is then amplified by audio amplifier stage 43, the output of which is fed into transformer 44, the ouput impedance of which matches the line connecting to the indicator unit 45. The construction details and intercoupling of the individual stages of the transmitter and receiver, as well as that of the rectifying type power supply, are of standard form and will be obvious from the figure.

Figure 4:
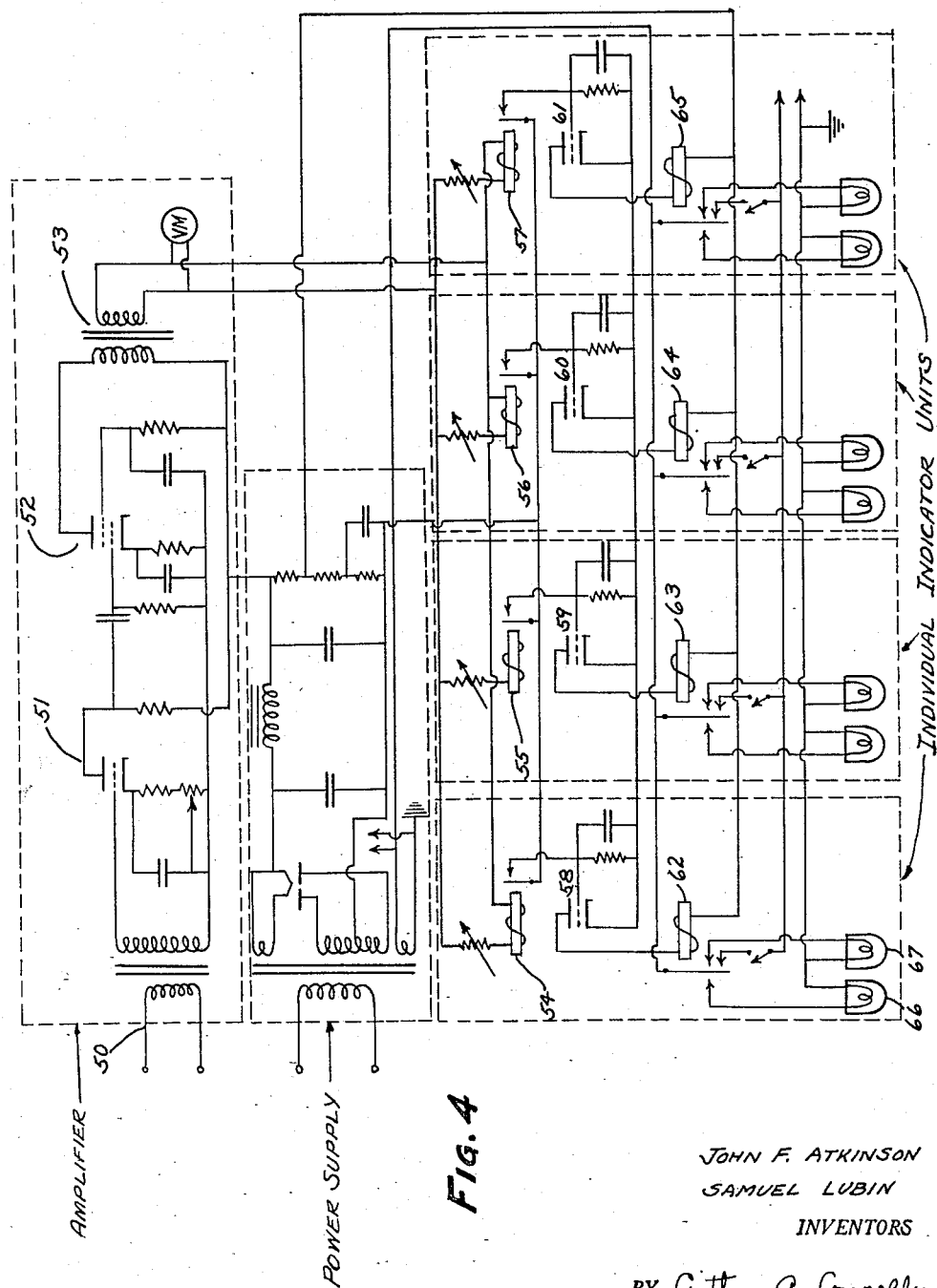
Figure 4 shows the schematic electrical circuit of one embodiment of an indicator unit of the invention.

Figure 4 is a circuit diagram of the indicator unit. The incoming modulating frequencies are fed into impedance matching transformer 50 of the amplifier and thence to audio frequency amplifier stages 51 and 52. The output signals are then fed through impedance matching transformer 53 and thence to frequency sensitive vibrating reed type relays 54, 55, 56, 57 and so on, of a plurality of individual indicator units. When vibrating, these relays excite vacuum tube relays 58, 59, 60 and 61, respectively, which in turn acuate relays 62, 63, 64 and 65 respectively. These relays in turn energize their associated red or green pilot lights 66, 67 etc. which indicate whether or not the associated modulating frequencies are present. As in Fig. 3 the details of the apparatus of Fig. 4 including its power supply are of standard form and will be clear to those skilled in the art.

Figure 6:
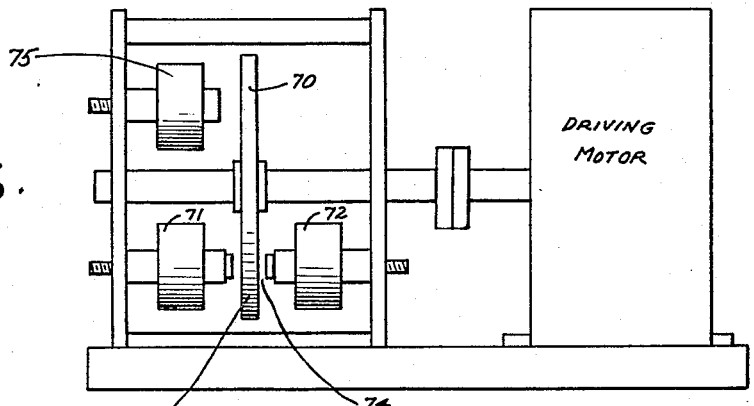
Figure 5:
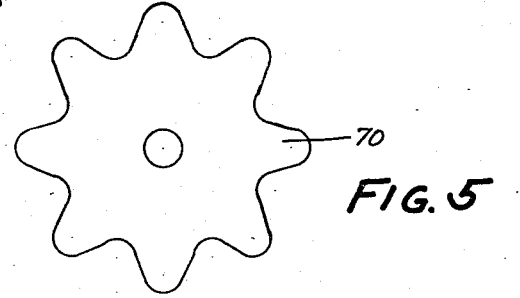
Figure 5 is a side view of the rotating disc of our mechanically driven modulator; which is shown in Figure 6.

Remote modulation may be accomplished by means of a mechanically operated reactance modulator as shown in Figures 5 and 6. A notched disc 70 of "high Q" powdered iron is caused to rotate between the pole pieces of two "high Q" coils 71 and 72 connected in series. This causes a rapid change of reluctance of the adjustable gaps 73 and 74 between the pole pieces which in turn causes a corresponding change in mutual inductance of the coils. Thus the inductance of coils 71 and 72 in series can be made to vary as a function of the notched disc speed. The limits of the inductance change can be controlled by the adjustment of the length of gaps 73 and 74. The mean value of inductance of the series combination can be varied by adjusting the inductance of coil 75 which is in series with coils 71 and 72.

Figure 7:
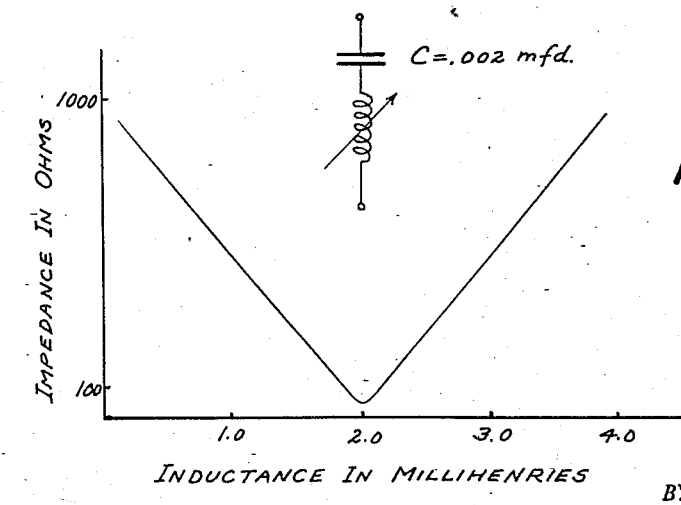
Figure 7 shows the resonance curve of one type of modulator of our invention.
Figure 8:
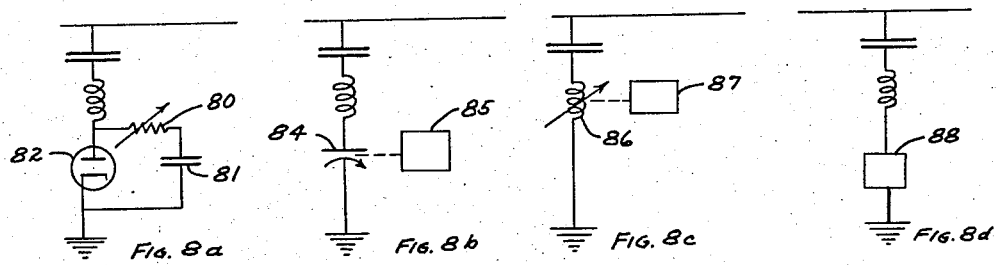
Figure 8 (a to d) shows the schematic electrical circuits of four types of reactance modulators of our invention.

Referring to Figure 7, when a line coupling capacitor, with a representative capacity of .002 mfd., is connected in series with a variable inductance, the series impedance of the combination will vary as shown in the curve. Thus if the variable inductance was the reactance modulator shown in Figure 6, the series impedance could be made to vary as a function of the notched disc speed. It will be noted that if "high Q" reactances are employed the series impedance drops to a very low value at series resonance. Thus, if such a combination of circuit elements were connected to a transmission line on which a carrier frequency signal was impressed by a transmitter at some distant point, the instantaneous value of impedance would be reflected to the transmitter output terminals and the transmitter output would thus be modulated at a frequency controlled by the notched disc speed. Remote modulation is thus accomplished.

Four representative methods of reactance modulation are shown in Figures 8a, 8b, 8c and 8d. In 8a the frequency of discharge of a gas diode 82 is controlled by the values of resistor 80 and capacitor 81. When the diode discharges it connects the resonant circuit (consisting of the series combination of the coupling capacitor and inductance) between the power line and ground. Thus, the resonant circuit is alternately connected and disconnected from the line at a frequency determined by the values of 80 and 81. In 8b the reactance of the series circuit is varied by driving a variable capacitor 84 in series with the line coupling capacitor and the inductance by a motor 85, thus detuning the series combination from the carrier frequency by a predetermined amount at a rate determined by the motor speed. The method shown in 8c is the same as the one described in Figure 6 above, where the detuning is caused by a variation in the inductance 86 by a motor drive 87. In 8d the reactance of the series circuit is varied by a mechanically or electrically driven contactor 88.

Figure 9:
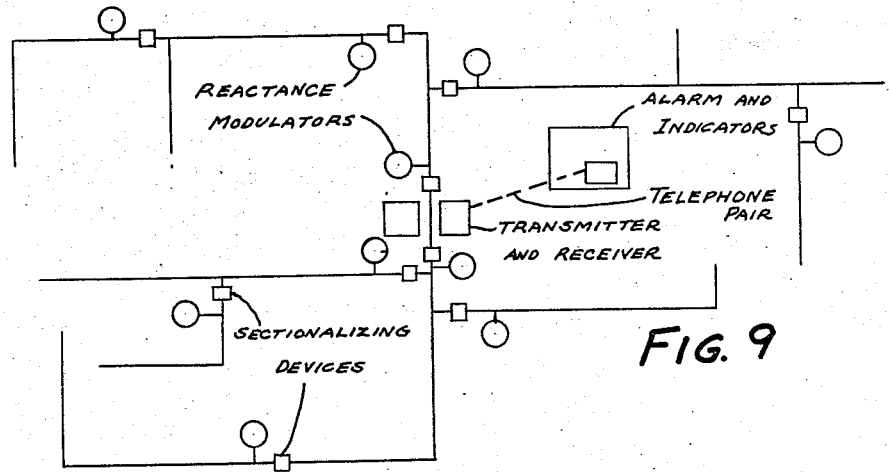
Figure 9 shows a typical complete layout for our carrier current monitoring system, utilized for indicating the opening of sectionalizing devices on an electric distribution system, employing the remote control methods of our invention.

Figure 9 shows a typical rural electric power distribution system with the locations of sectionalizing devices, reactance modulators and transmitter and receiver units indicated relative to the system layout.

Figure 10:
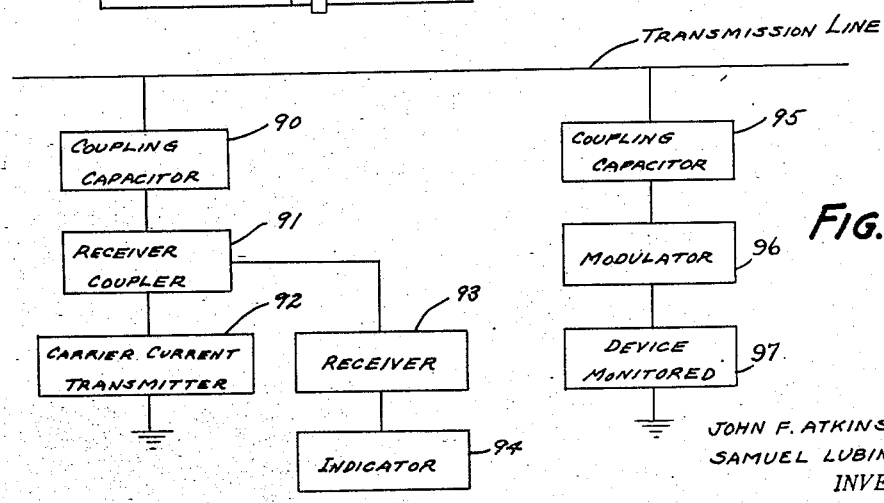
Figure 10 shows a typical complete layout for our telemetering system.

Figure 10 illustrates a layout for a telemetering system, wherein the carrier transmitter 92, receiver 93, coupling capacitors 90 and 95 and receiver coupler 91 operate in the same manner as described above in connection with Figure 2. Modulator 96 may be any one of the modulators shown in Figure 8. The frequency of interruption or detuning of the modulator may be governed by a control operated by the device monitored. For example, in the case of the measurement of a liquid level the change in position of a float on the surface of the liquid may be utilized to change the speed of motors 85 or 87 (Figure 8) or the value of the variable resistor 80 in Figure 8, thus changing the frequency of interruption or detuning of modulator 96 in Figure 10. The output of receiver 93 will thus consist of a variable frequency equal to the frequency of interruption or detuning of modulator 96. This variable frequency may be fed into indicator 94 which consists of a frequency meter or other frequency sensitive device which may then be calibrated in terms of the quantity measured by the device 97 being monitored.

It is apparent from a consideration of the invention that simplified and inexpensive equipment can be used to operate the remote monitoring system. The maintenance of the system and its various local stations is substantially reduced in comparison with the prior methods which employ individual transmitters etc. at each local station. With precise indicating means, it is possible to operate a central station for a very large number of local stations by utilizing numerous combinations of modulating and carrier frequencies. It is also possible to utilize the system of the invention for the monitoring and measuring of remotely located physical data by means of carrier current, examples of such data being current, voltage, power or energy on an electric power system, water level in a stream or tank, gas pressure or other telemetering applications. One of its primary uses is for simplified indication of the opening of circuit breakers or other sectionalizing devices on an electric power transmission or distribution line. This invention is particularly adapted for telemetering applications which include monitoring an electrical device such as a voltmeter, ammeter, or wattmeter on a power transmission or distribution system, or monitoring of other devices such as gauges for indicating levels of liquids, rate of flow of liquids or gases, pressures, stream flow and similar physical quantities.

As many apparently widely different embodiments of this invention may be made without departing from the spirit and scope hereof, it is to be understood that the invention is not limited to the specific embodiments hereof except as defined in the appended claims.

We claim:

1. A remote monitoring system comprising in combination a carrier current generator, transmission lines for carrying said current to a plurality of remote points at each of which is located a modulator for uniformly varying the amplitude of said current without substantially affecting its frequency, each of said modulators having its own characteristic rate of amplitude variation, and comprising an inductance and capacitance connected so as to be resonant at the carrier current frequency and having means for varying the resonant circuit at a characteristic low periodic rate, and means for detecting at a distant point each of said amplitude variations.

2. The system of claim 1 wherein the resonant impedance is detuned by varying the magnitude of the inductance without disconnecting the impedance from the line.

3. The system of claim 1 wherein the resonant impedance is detuned by varying the magnitude of the capacitance without disconnecting the impedance from the line.

4. The system of claim 1 wherein the resonant impedance is interrupted by removing the resonant circuit from the line by means of a switch.

5. In a remote monitoring system for automatically checking, at a single location, on a plurality of operating conditions in remotely located apparatus having electrical communication elements establishing electrical communication between said apparatus and said single location; a carrier current source for connection to impress alternating carrier current upon said communication elements; modulation structure including resonant circuit means tuned to the carrier frequency for connection to said communication elements to uniformly vary the amplitude of said carrier without substantially affecting its frequency by shifting the resonance of the resonant circuit means at rates of amplitude modulation in conformity with differences at said apparatus; and an indicating device for connection at said single location to said communication elements to separately detect, identify, and indicate the presence of said rates of amplitude variations on the carrier currents carried by said communication elements.

6. The combination as defined by claim 5 wherein the remotely located apparatus has a plurality of spaced portions, the communication elements are in the form of a single pair of electrical conductors, the modulation structure comprises a plurality of different modulators, each having a resonant circuit and a different modulation frequency, for individual connection at each of said spaced portions to the pair of conductors, and the indicating device automatically shows by the absence of modulation the location of any misoperation with respect to the individual spaced portions.

7. The combination as defined by claim 5 in which the modulation structure includes electric motor mechanism connected to rotate and effect amplitude modulation at a rate dependent upon the rate of motor rotation.

8. The combination as defined by claim 6 in which the individual modulators each include a variable load circuit for the carrier current carried by the conductors, said circuit being connected for changing the carrier current loading in accordance with the desired modulation rate.

JOHN F. ATKINSON.
SAMUEL LUBIN.

REFERENCES CITED

The following references are of record in the file of this patent:

UNITED STATES PATENTS

| Number | Name | Date |
|---|---|---|
| 1,639,000 | Horton | Aug. 16, 1927 |
| 2,039,404 | Green | May 5, 1936 |
| 2,039,405 | Green | May 5, 1936 |
| 2,198,901 | Boswau | Apr. 30, 1940 |
| 2,286,428 | Mehler | June 16, 1942 |
| 2,295,442 | Wilhelm | Sept. 8, 1942 |
| 2,398,046 | Schaefer | Apr. 9, 1946 |

FOREIGN PATENTS

| Number | Country | Date |
|---|---|---|
| 261,384 | Great Britain | Oct. 6, 1927 |